United States Patent [19]

Draper

[11] Patent Number: 4,514,891
[45] Date of Patent: May 7, 1985

[54] METHOD OF CONVERSION OF VEHICLE BODIES

[75] Inventor: David L. Draper, Hamburg, Mich.

[73] Assignee: Cars & Concepts, Inc., Brighton, Mich.

[21] Appl. No.: 512,522

[22] Filed: Jul. 11, 1983

Related U.S. Application Data

[62] Division of Ser. No. 282,078, Jul. 10, 1981, Pat. No. 4,457,555.

[51] Int. Cl.³ .......................... B22D 19/10; B23P 6/00
[52] U.S. Cl. .................................................. 29/401.1
[58] Field of Search ............... 29/401.1; 296/188, 195, 296/204, 186

[56] References Cited

U.S. PATENT DOCUMENTS

| | | | |
|---|---|---|---|
| 2,662,793 | 12/1953 | Lindsay | 296/195 |
| 3,423,122 | 1/1969 | Wessells | 296/186 X |
| 3,765,715 | 10/1973 | Franchini | 296/188 |
| 4,014,587 | 3/1977 | Eggert, Jr. | 296/204 |
| 4,081,197 | 3/1978 | Ackel | 296/204 |
| 4,238,876 | 12/1980 | Monroe et al. | 29/401.1 |
| 4,251,104 | 2/1981 | Holt | 29/401.1 X |
| 4,261,615 | 4/1981 | Deaver | 29/401.1 X |
| 4,346,930 | 8/1982 | Narthey | 296/188 |

*Primary Examiner*—Charlie T. Moon
*Attorney, Agent, or Firm*—Brooks & Kushman

[57] ABSTRACT

A vehicle body of the convertible or targa type and the method of converting such a body from a sedan type vehicle body in which a reinforcing structure is disposed within the passenger compartment and is fastened thereto to form a centrally extending structural channel member extending longitudinally within the passenger compartment and having forward and rearward transverse portions fastened to the forward and rearward suspension supports of the body to transmit torsional and beaming loads imposed on the vehicle body by the ground engaging wheels.

3 Claims, 14 Drawing Figures 4,514,891

METHOD OF CONVERSION OF VEHICLE BODIES

This application is a division of application Ser. No. 282,078 filed July 10, 1981, which issued as U.S. Pat. No. 4,457,555 on July 3, 1984.

This invention relates to vehicle bodies of the type having an open passenger compartment and particularly to the conversion of vehicle bodies with rigid roofs to such bodies.

Most automobile manufacturers have discontinued the manufacture of vehicles of the convertible type with a soft-type top closing the passenger compartment or of the targa type with a detachable roof panel. The apparent reason for the discontinuence of such manufacture of those vehicles is that low volume makes manufacture uneconomical. Also such vehicles require reinforcement to afford sufficient strength which in the usual sedan type body is formed by a rigid metal roof panel. The reinforcing that must be added to the convertible or targa body has required the addition of substantial weight thereby undesirably decreasing fuel efficiency. In spite of the manufacturers decisions to discontinue the manufacture of such vehicles, a demand for convertible or targa type vehicles continues and such demand must be met on a customized basis by conversion of conventional sedan type bodies.

It is an object of this invention to provide a vehicle body of the convertible or targa type which maintains proper vehicle strength for crashworthyness and driveablity.

It is also an object of the invention to provide a method of converting conventional sedan type vehicles to convertible or targa type vehicle bodies.

Another object of the invention is to provide a body of the convertible or targa type and the method of making it which results in a strong body without the usual increase in weight of the body.

Yet another object of the invention is to provide a vehicle body of the convertible or targa type and the method of making it in which a tunnel is incorporated substantially longitudinally and centrally of the vehicle to absorb bending and torsional loads.

A further object of the invention is to provide a vehicle body of the convertible or targa type and the method of making it in which modification is accomplished from the interior of the vehicle Basically the invention provides a vehicle body of the convertible or targa type in which a reinforcing member is installed within the passenger compartment and is joined to the floor pan, the forward and rearward sub-frame to form a central tunnel-like construction having forward transverse and rearward transverse members absorbing loads imposed by the wheels and transmitted through the suspension system to the forward and rearward sub-frame. The reinforcing structure has a generally U-shaped configuration and the main portion extends generally longitudinally of the vehicle and overlies an exsisting tunnel structure to form a closed tube for absorbing torsional and bending loads. The reinforcing structure has a height no greater than the seat members disposed at opposite sides so that a maximum cross-section is obtained to afford strength. The reinforcing structure includes specifically formed joints which prevent buckling and further add strength and at the same time keep weight at a minimum.

The preferred embodiments of the invention are illustrated in the drawings in which.

Figure 7:
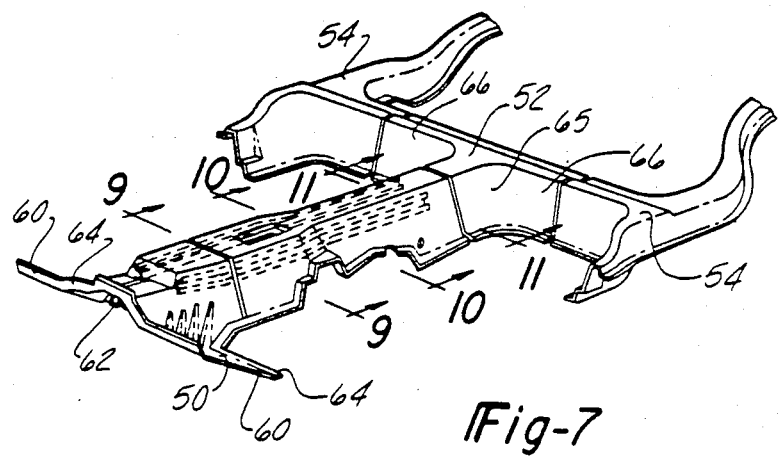
FIG. 7 is a perspective view of the reinforcing structure which is installed in the vehicle body.
Figure 9:
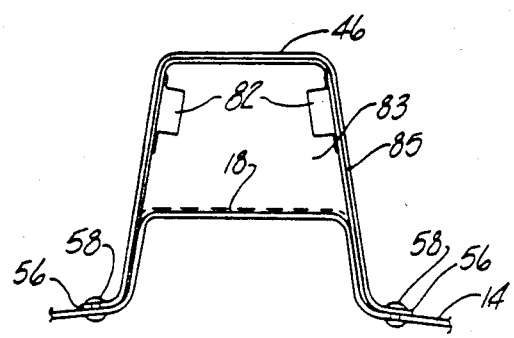
Figure 10:
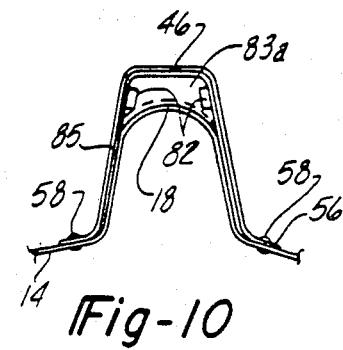
Figure 11:
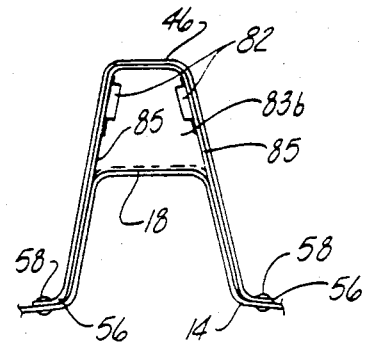
Figure 12:
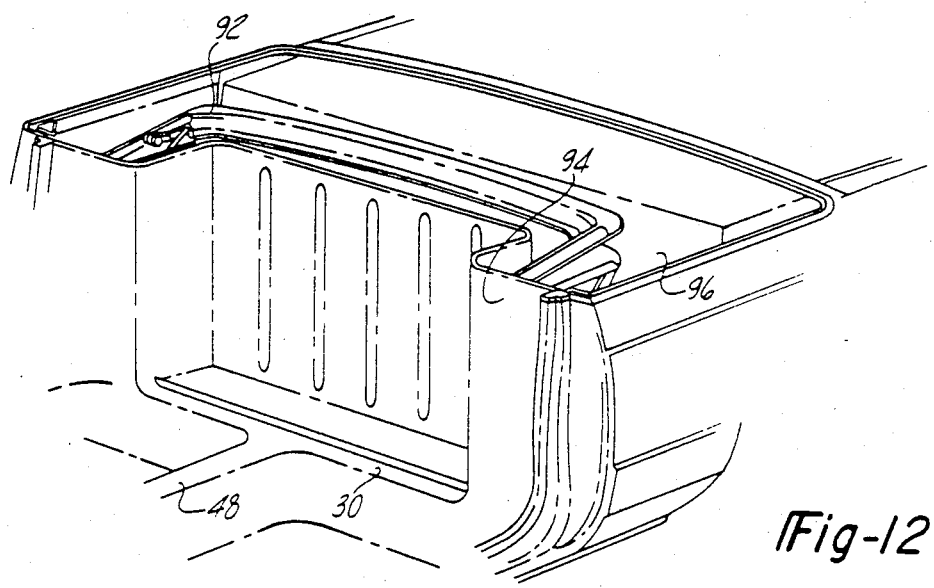
Figure 13:
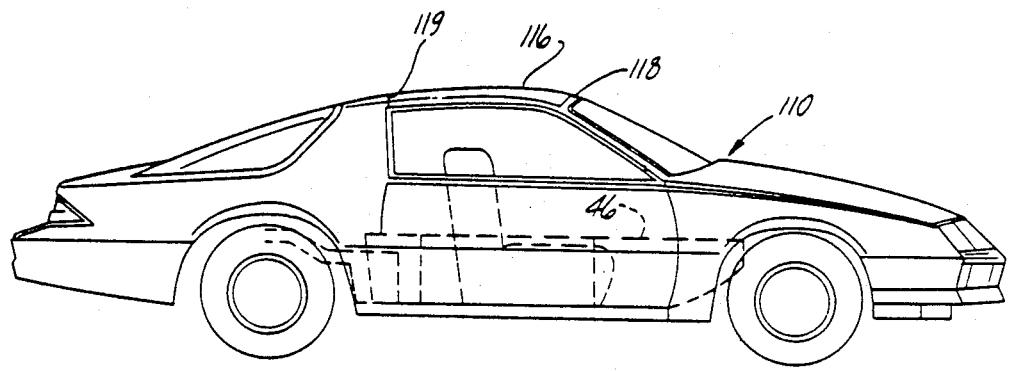

FIGS. 9, 10 and 11 are cross-sectional views at an enlarged scale taken generally on lines 9—9, 10—10 and 11—11, respectively in FIG. 7;

FIG. 12 is a perspective view of a portion of the vehicle body during the time that it is being modified;

FIG. 13 is a view of another form of sedan vehicle which is modified; and

Figure 14:
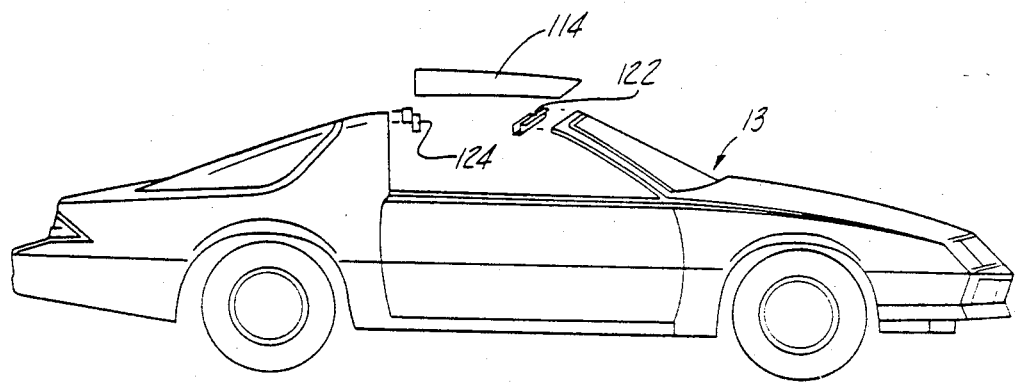

FIG. 14 is an exploded view of a vehicle body of the targa type which also embodies the invention.

Figure 1:
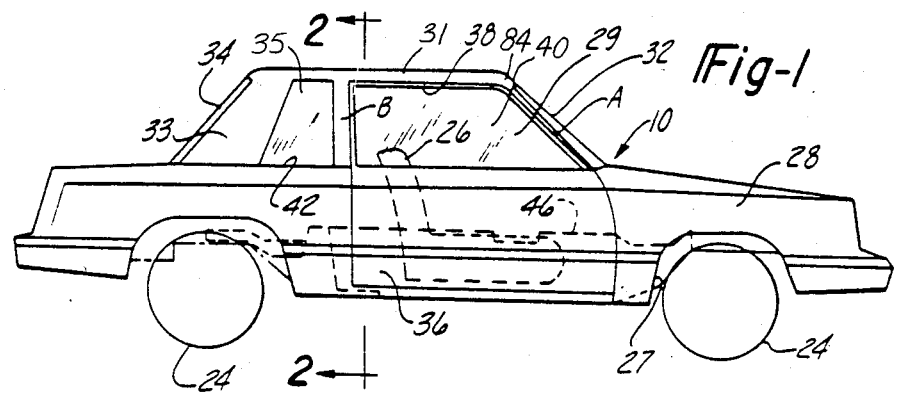
FIG. 1 is a diagrammatic side elevation of a sedan type vehicle which is modified in accordance with principals of the invention.
Figure 2:
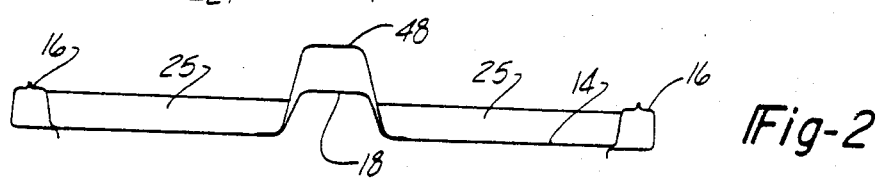
FIG. 2 is a diagrammatic cross-sectional view taken generally on line 2—2 in FIG. 1 and at a slightly enlarged scale.
Figure 3:
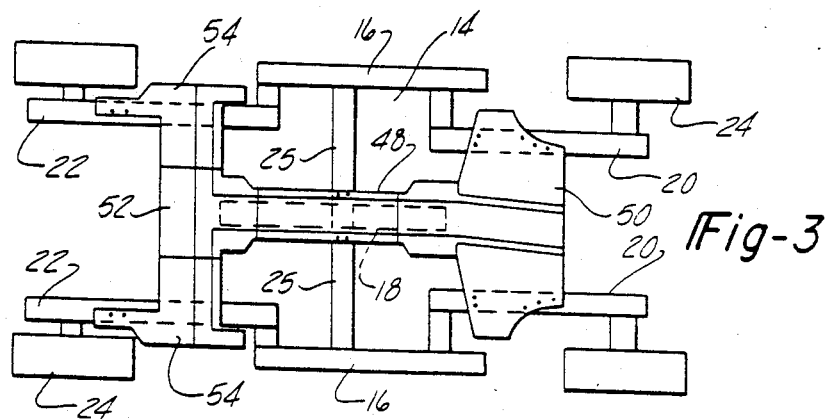
FIG. 3 is a top view of the floor pan of a vehicle body being modified.
Figure 4:
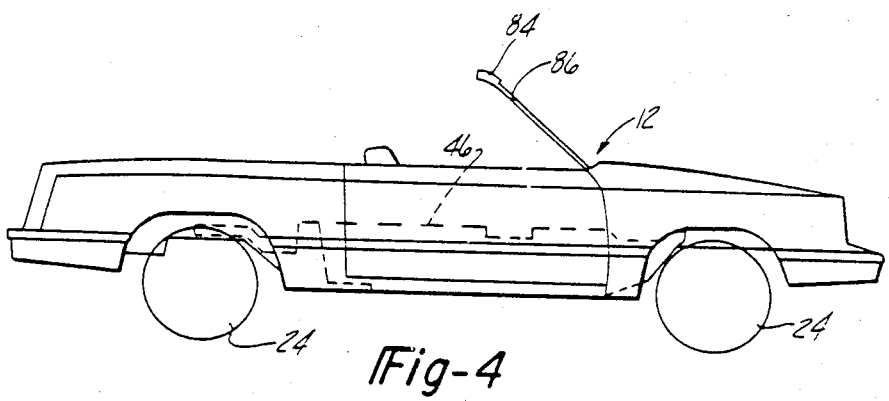
FIG. 4 is a side elevational view of the vehicle in FIG. 1 after the top has been removed.
Figure 5:
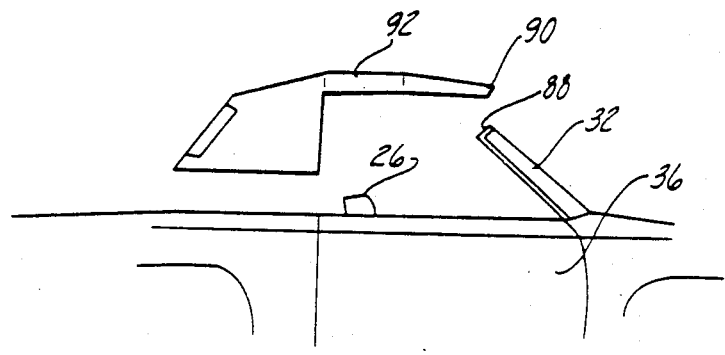
FIG. 5 is a partial view of the vehicle seen in FIG. 4 with parts broken away and removed.
Figure 6:
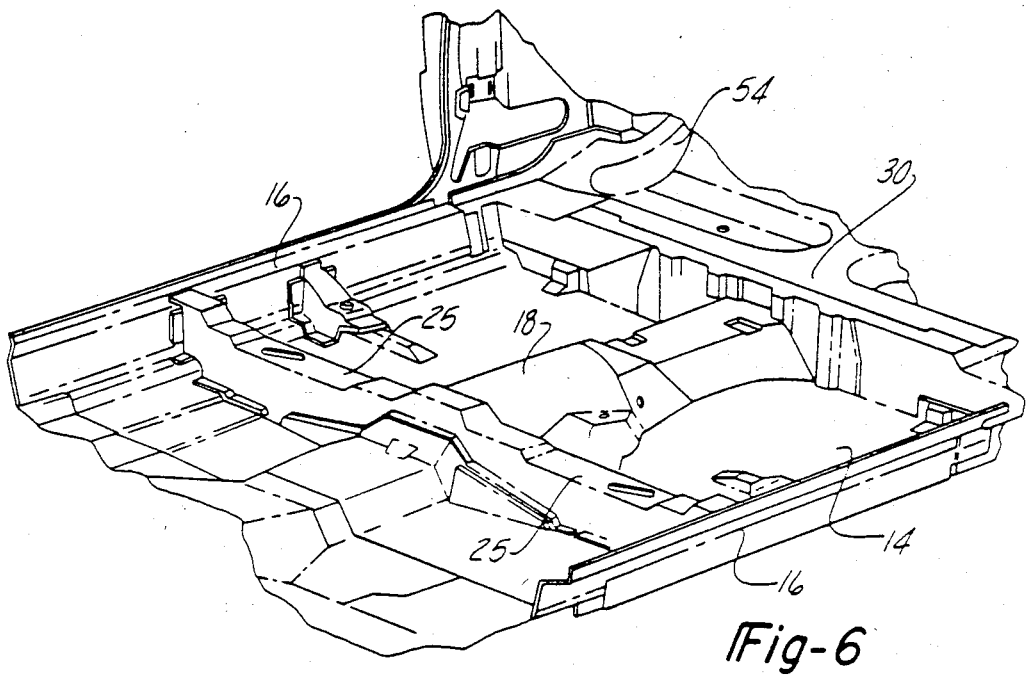
FIG. 6 is a perspective view of a portion of a floor pan of a vehicle body.

In accordance with the preferred embodiment of the invention a conventional sedan type body indicated at 10 in FIG. 1 is modified and converted into a convertible body indicated generally at 12 in FIG. 4 or targa body indicated at 13 in FIG. 14. Referring to FIGS. 1 and 2 the sedan body 10 is of the self-supporting or unitized type and includes a floor pan 14. Typically such bodies have rocker panels 16 at opposite sides which serve to reinforce the floor pan. Also usually a tunnel 18 opens downwardly and is disposed centrally of the vehicle. As seen in FIG. 6 such a tunnel 18 may take an irregular shape and can be used for the purpose of housing a drive shaft for rear wheel drive vehicles or the exhaust system for front wheel drive vehicles. The longitudinally extending tunnel 18 serves to strengthen the floor pan 14 in a longitudinal direction. The floor pan 14 also is formed integrally with a forward sub-frame made up of a pair of side sub-frame members 20 and a rearward sub-frame made up of a pair of rearward sub-frame members 22. The forward and rearward sub-frame members 20, 22 form the foundation for the suspension system (not shown) which includes the ground engaging wheels 24.

The floor pan 14 also is shown as including a formed cross member 25 which extends from the tunnel 18 to the rocker panels 16 at opposite sides of the floor pan 14. The cross members 25 serve to reinforce and stiffen the floor pan and act as a support or anchor for such equipment as seats 26 and for safety belts, not shown.

The forward portion of the floor pan typically slopes upwardly and forwardly of the front wheels 24 to form a firewall 27 separating the engine compartment 28 and the passenger compartment 29. The rear portion of the floor pan 14 has a slightly elevated deck 30 merging with the tunnel 18 and forming a support for rear seats, not shown.

The remainder of the body sheet metal is formed integrally with the floor pan 14 and includes a sheet metal roof 31 supported in elevated position above the passenger compartment. The support for the roof 31 is in the form of a pair of forward pillars, commonly referred to as "A" pillars and so designated in the drawings, disposed at opposite sides of the vehicle to form opposite sides of the windshield 32. The rear of the roof 31 is supported by integral side panels 33 disposed at opposite sides of the body and acting to form opposite sides of a rear window 34. An intermediate portion of the roof is supported by a pair of "B" pillars disposed rearwardly of the doors 36. The "B" pillars and the side panels 33 frame oppostie sides of rear, side windows 35.

The doors 36 may be provided with an upper frame 38 for framing a sliding window glass panel or light 40. The glass in the windshield 32, the door window 40 and rear window 34 have their lower edges substantially horizontally aligned along a line called a belt-line and designated at 42 in FIG. 1.

The various loads imposed on the sedan body 10 by the wheels 24 are absorbed through the floor pan and the roof 31. The strength necessary to transmit loads between the forward and rearward wheels is referred to as beaming strength, that is the strength necessary to resist distortion of the body between the front and rear wheels. The ability of the body to absorb diagonal loads between the front wheel at one side of the vehicle and the rear wheel at the opposite side of the vehicle is referred to as torsional strength.

Conversion of the vehicle body 10 is conducted from the interior of the body so as not to interfere with the under body structure and attachments such as the drive train, suspension, and the like. The conversion begins with the interior of the passenger car body 10 stripped of all interior trim such as carpeting, mats, moldings and the like. Also, the seats are completely removed.

Conversion continues with the installation of a reinforcing structure 46 which includes a main center section 48, a forward section 50, a rear section 52 and a pair of rear extension members 54. All of the sections are of generally irregular, symmetrical configurations but have portions forming inverted U in cross sections.

The center section 48 is an inverted U shape cross section which as seen in FIGS. 9, 10 and 11 taken at different transverse sectional lines in FIG. 7, has a vertical height greater than the corresponding section of the tunnel 18. Also the tunnel section 46 has outwardly and oppositely extending flange portions 56 which are adapted to engage the floor pan 14 and to be fastened thereto. Fastening preferrably is conducted by the use of rivets 58. Additionally, the flange can be secured to the floor pan by the use of a structural polyurethane adhesive sealant between the flange portions 56 and the floor pan 14. Also, tunnel structures may be welded instead of riveted. With all methods of connection, the center section 48 forms a closed tubular structure with the tunnel 18.

Figure 8:
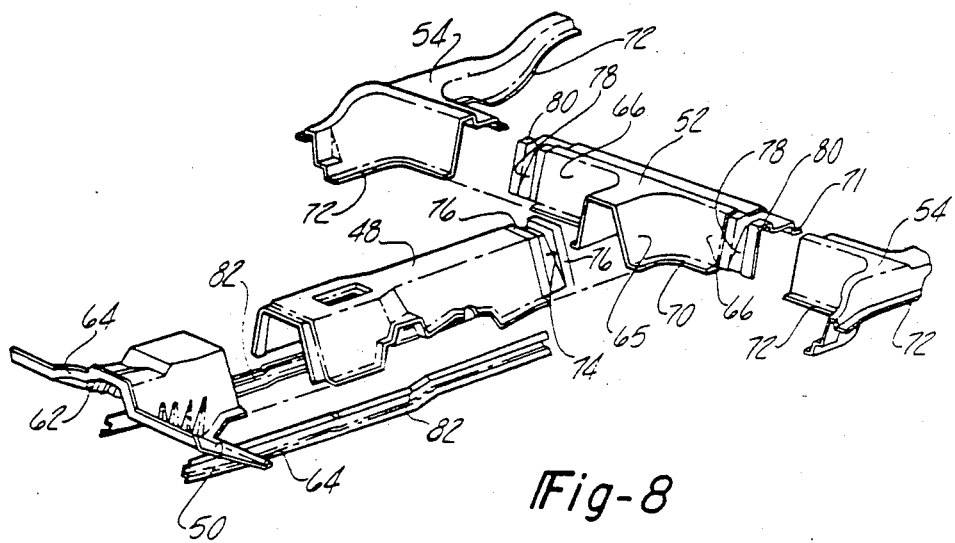
FIG. 8 is a view of the reinforcing structure of FIG. 7 with the parts in exploded relationship.

The forward section 50 of the reinforcing structure 46 includes a tunnel portion 59 having a configuration at its rearward end conforming generally to the forward end of the center section 48 and in addition has a pair of oppositely extending wing portions 60 which are formed integrally with the forward section 50. As seen in FIGS. 7 and 8, the wing portions 60 are reinforced by a plurality of downwardly opening reinforcing channels 62 which when fastened to the floor pan 14 form closed tubular structures for adding strength and rigidity to the merged constructions. Like the center section 48, the forward section 50 has flanges 64 around its perimeter which aubt the surfaces of the floor pan 14 and are connected thereto by means of rivets 58 and adhesive.

The rear section 52 of the reinforcing structure 46 has a U-shape central section 65 which merges with laterally extending portions 66 the outboard ends of which are adapted to be joined with the pair of rear extensions 54. Both the rear section 52 and the side extension 54 are provided with flanges 70 which are adapted to be fastened with rivets and adhesibe to the floor pan 14. In addition, the rearward section 42 is provided with a rearward transverse flange 71 which is adapted to be fastened by way of adhesive and rivets to the rear deck 30. The side extensions 54 are provided with flanges 72 which are fastened by way of rivets and if desired, adhesive to the rear deck 30 and to the rear sub-frame members 22.

The rear section 52 is joined to the center section 48 by means of a joint construction which adds rigidity and helps to absorb torsional loads that are imposed on the tunnel structure 46. As best seen in FIG. 8, the joint includes a channel portion 74 formed adjacent the rear end of the center section 48. Opposite sides of the channel portion 74 are provided with seating surfaces 76 which abut the inside surface of the forward portion 65 of the rear section 52. The seating surfaces 76 and the rear section 52 can be joined together by welding or by the use of rivets and when so joined the composite structure forms a tubular construction affording great strength and rigidity in relation to the weight of the material used and acts to prevent buckling when large loads are imposed.

The outboard ends of the lateral extension 66 of the rear section 52 are also provided with a construction including channel portions 78 and seating surfaces 80 which are joined to the side extensions 54 in the same manner that the center section 48 is connected to the rear section 52. Again, this construction adds great strength with minimum weight.

Additional rigidity and strength can be obtained by the use of elongated members 82 seen in FIGS. 7 and 8 having a generally hat-shaped cross section. The members 82 are attached by welding or rivets to the inside surfaces of the tunnel structure 46 and form additional tubular reinforcing portions.

In some instances the reinforcing structure may be further strengthened by providing transverse bulkheads 83, 83a or 83b as seen in FIGS. 9, 10 and 11, respectively. The bulkheads 83, 83a and 83b have flanges 85 around the periphery of the bulkheads and which are attached to the tunnel 18 and reinforcing structure 46 by means of rivets or welding. Such bulkheads act to prevent buckling of the reinforcing structure.

In addition to the described manner in which the reinforcing structure 46 is connected to the floor pan 14, it also is connected directly to the reinforcing portions of the floor pan 14 such as connection of the forward section 50 to the forward sub-frames 20, the center section 48 to the cross members 25 and the rear section 52 to the rearward subframe 22. This connection also is made by way of rivets 58 or welding.

In addition to the described manner in which the reinforcing structure 46 is fastened to the floor pan 14, the forward section 50 is connected directly to the forward sub-frames 20, the center section 48 is connected to the cross-members 25 and the rear section 52 is connected directly to the rearward sub-frame members 22. These connections also are made by way of rivets 48, and adhesive or by welding.

With the passenger compartment stripped of all lining materials to expose metal surfaces the reinforcing structure 46 can be installed. Preferably the center section 48 is installed followed by the addition of the forward and rearward sections 50 and 52 and the rearwardly extending sections 54. The connections are made by way of riveting and adhesive but welding may be used if reinforcement is installed prior to sheet metal painting.

After the reinforcing structure 46 is installed within the passenger compartment 29 of the body 10, removal of the top metal can be initiated. This can be accomplished by removal of all of the glass which includes the glass in the windshield 32, rear window 34, the side windows 35 and door windows 40. Thereafter the body 10 can be cut with a metal saw along the belt line 42 to sever the "B" pillars and side panels 33. In addition the roof panel 31 can be cut immediately rearwardly of the windshield header 84 and thereafter can be removed from the remainder of the body 10. In some conversions the "A" pillars forming opposite sides of the windshield 32 are cut at a line indicated at 86 and the windshield header 84 also is removed. In that case, the step of cutting the roof panel 32 rearwardly of the windshield header 84 can be omitted and the "A" pillars can be severed at the cut 86 and removed together with the roof panel 31.

With the roof construction and windshield header 84 removed the body can be further refined by the addition of a new windshield header 88 particularly adapted for receiving and detachably connecting to the forward edge 90 of a convertible, foldable and retractable top construction 92. The addition of a new header 88 makes it possible to lower the roof line of the convertible body 12 if so desired by removing a section of the "A" pillars.

In addition to removal of the roof structure 31 in some vehicles having a framed door 36 it is necessary to modify the doors by removing the frames 38. This also is accomplished by cutting along the belt line 42. Conversion of a framed door is more fully described in co-pending application of the assignee of the present application but in brief entails removing the frame 38 by sawing along the belt line 42, by removing the glass forming window 40 and by substituting a new glass to accomodated the lowered roof line and the space fomerly occupied by the window frame 38.

In order to accomodate the folding top 92 a rearward portion of the passenger compartment is provided with a bulkhead 94 as seen in FIG. 12 which forms a cavity 96 to receive and to store the folding top 92. The interior of the passenger compartment can now be covered with carpeting and with lining material to cover all of the exposed surfaces and a rear seat may be included. Forward bucket seats 26 are installed in a conventional manner at opposite sides of the center section 48 of the tunnel structure 46. As seen in FIG. 1 the seating surface has a height approxiamtely equal to the height of the tunnel structure 46. This makes it possible to obtain the maximum cross sectional area for the tunnel structure 46 to enhance its torsion absorbing capabilities.

Referring now to FIGS. 13 and 14, another embodiment of the invention is shown in which a two-door sedan type vehicle body 110 is converted to a targa type body 13. A targa type body is one in which the roof is completely removable to form an open passenger compartment as seen in FIG. 14. Vehicles of this type also are subject to beaming and torsional loads which must be resisted by structure added to replace the typical integral roof panel 116.

The sedan body 110 is slightly different than the vehicle body 10 but can be considered as incorporating a floor pan and suspension supports very similar to the floor pan 14 and suspension supports 20 and 22.

In this embodiment of the invention, the interior of the passenger compartment is stripped of all carpeting, lining and moldings to expose the metal surfaces after which a reinforcing tunnel structure 46 is installed in the same manner as in the body 10. Thereafter, the roof 116 is cut immediately to the rear of the windshield header 118 and along a line 119 substantially in alignment with the rear edge of the upper portion of the door opening. Thereafter, a forward frame member 122 is attached to the metal edge immediately to the rear of the windshield header 118 and a rearward frame member 124 is attached to the cut edge 119 to the rear of the opening formed by removing the roof section. the frames 122 and 124 can be additionally modified to receive seal members engageable with the detachable panel 114.

It will be noted that in both embodiments of the invention, the reinforcing tunnel structure 46 is installed prior to any modification of the roof 31 or 116. In this manner, the original structural integrity of the body 10 or 110 can be maintained without the necessity of blocking or otherwise supporting the vehicle body.

The embodiments of the invention in which an exclusive property or privilege is claimed are defined as follows:

1. The method of converting a sedan passenger automobile body which includes a continuous roof panel, a floor pan and suspension supports formed integrally to each other, the steps comprising: adding a reinforcing structure having a channel member with inverted U-shaped cross-sections centrally and longitudinally within the interior of said body, fastening said channel member to said floor pan, adding a forward transverse reinforcing member within the interior of said body and fastening it to the channel member, to the floor pan and to the forward suspension supports, adding a rearward transverse member to the interior of said body and fastening it to the channel member, to the floor pan and to the rear suspension supports, cutting and removing the continuous roof panel completely from one side of said body to the other and along the sides of the continuous roof panel, and replacing a detachable roof panel in the cut away portion of the continuous roof panel.

2. The method of claim 1 wherein the forward portion of the removed roof panel is cut along a line adjacent the windshield header.

3. The method of claim 1 wherein the doors on said vehicle have a framed window and wherein said frame is removed by cutting along a line at the lower edge of said window opening.

* * * * *